United States Patent [19]

Ackerman, Jr.

[11] 3,922,794
[45] Dec. 2, 1975

[54] ADJUSTABLE BASE FOR MOUNTING AN OPTICAL FIREARM SIGHT
[75] Inventor: William R. Ackerman, Jr., El Paso, Tex.
[73] Assignee: W. R. Weaver Company, El Paso, Tex.
[22] Filed: Oct. 4, 1974
[21] Appl. No.: 512,833

[52] U.S. Cl. ................................................ 33/248
[51] Int. Cl.² ........................................... F41G 1/38
[58] Field of Search ............................... 33/247, 248

[56] References Cited
UNITED STATES PATENTS
| | | | |
|---|---|---|---|
| 2,073,210 | 3/1937 | Horsrud | 33/248 |
| 2,224,783 | 12/1949 | Gibbs | 33/248 |
| 2,496,045 | 1/1950 | Ford | 33/248 |
| 3,177,587 | 4/1965 | Hart | 33/248 |

Primary Examiner—Richard E. Aegerter
Assistant Examiner—Steven L. Stephan
Attorney, Agent, or Firm—Donald R. Motsko; William W. Jones

[57] ABSTRACT

A mount for an optical gunsight, which mount includes windage and elevation adjustments for the optical axis of the gunsight.

3 Claims, 3 Drawing Figures

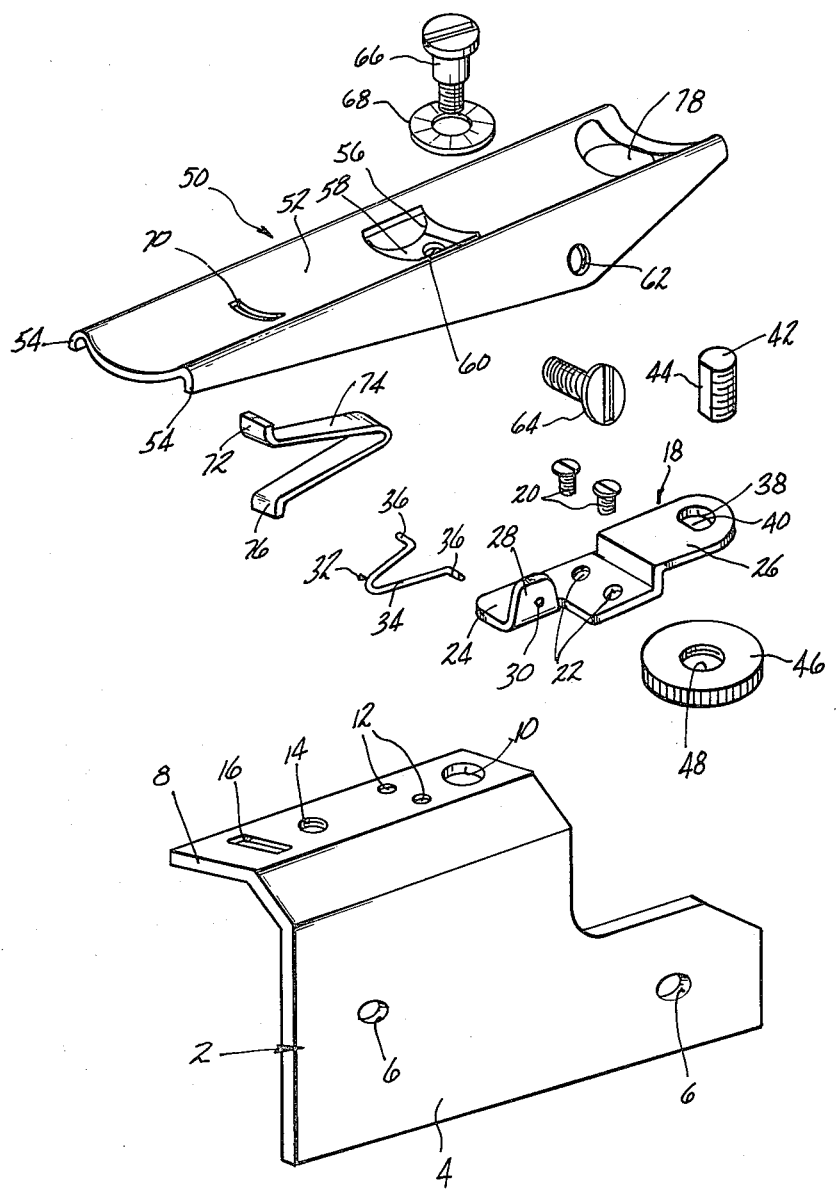

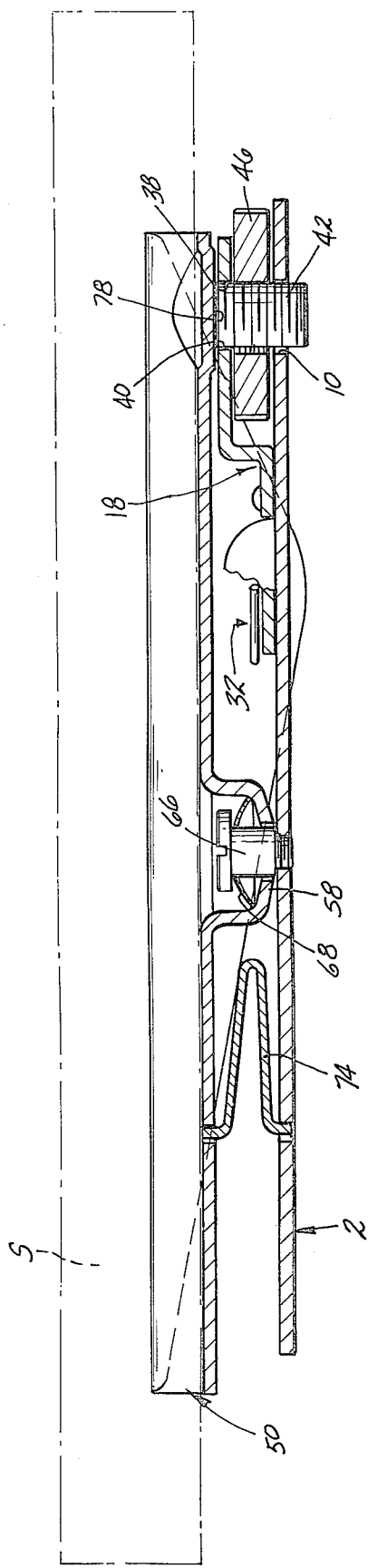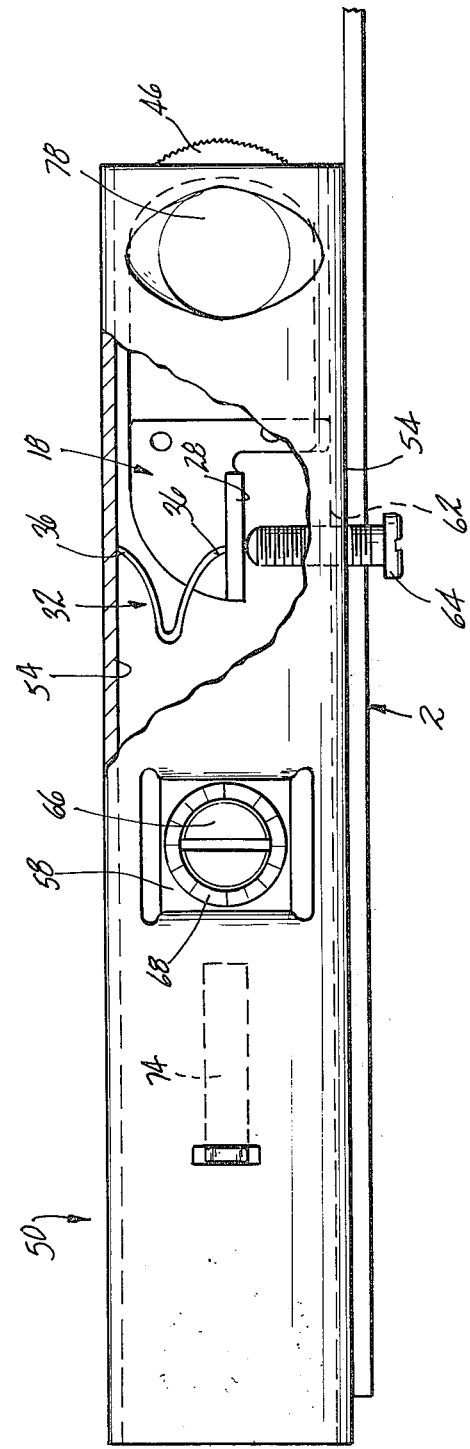

ADJUSTABLE BASE FOR MOUNTING AN OPTICAL FIREARM SIGHT

This invention relates to an adjustable mount for an optical gunsight wherein the mount has means for accomplishing windage and elevation adjustment of the optical axis of the gunsight.

Adjustment for windage and elevation of the optical axis of a gunsight has been accomplished in two general ways; 1) by providing for internal adjustment means within the gunsight itself; and 2) by providing a mount for the gunsight which can be moved vertically and horizontally to provide the necessary adjustment. This invention relates to the latter solution and concerns an improved mount of the horizontally and vertically adjustable variety.

The prior art adjustable mounts are typified by the disclosures of U.S. Pat. Nos. 1,835,576, issued Dec. 8, 1931 to R. Sparr; and 2,951,292, issued Sept. 6, 1960 to M. P. Buehler.

Attempts by the prior art to provide an adjustable mount have resulted in oftentimes complicated constructions, and other times constructions that would not operate as intended. Lock and unlock combinations of set screws have been employed to produce lateral and vertical movement of the sight complicating adjustment unduely. Mounts have been proposed which require the mount base to bend in order to function properly. Other mounts have been proposed which would require the scope tube itself to bend if they were to work as described. Still other mounts have been proposed where the mount and/or scope must be removed from its support to be adjusted.

Thus what would appear to be a simple project has spawned a great variety of complicated, imppractical, and even inoperative solutions.

The mount of this invention includes a base for attachment to the firearm; and intermediate member, termed an "anvil," secured to the base and providing bearing means for certain portions of the adjustment elements; and a cradle for holding the scope, the cradle being pivoted with respect to the base about a single pivot in both the vertical and horizontal directions. Use of a single pivot permits increased simplicity of construction and increased lattitude of pivoting to occur. A single threaded windage adjustment is used as is a single threaded elevation adjustment. Springs are used to bias the cradle in both the horizontal and vertical directions to act in concert with the threaded adjustments to produce pivoting movement of the cradle resulting from turning of the threaded adjustments in either direction. Simplicity of operation is the result as there is no need to unlock any parts to perform an adjustment operation. Adjustments can be made with one hand while sighting on the target if necessary.

It is, therefore, an object of this invention to provide an optical gunsight mount of the type having windage and elevation adjustment capabilities built in.

It is a further object of the invention to provide a mount of the character described wherein the sight-holding portion of the mount is pivoted about a single pivot and is spring biased in both the vertical and horizontal directions for accomplishing windage and elevation adjustment.

It is an additional object to provide a mount of the character described which is of simple construction and inexpensive to produce.

These and other objects and advantages of the invention will become more readily apparent from the following detailed description of one embodiment of the mount taken in conjunction with the accompanying drawings, in which:

FIG. 1 is an exploded perspective view of one embodiment of a mount formed in accordance with this invention;

FIG. 2 is a longitudinal vertical sectional view of the mount of FIG. 1 partially fragmented for clarity; and FIG. 3 is a top plan view of the mount partially fragmented for clarity.

Referring now to the drawings, the mount includes a base 2 which is shown as being of the side-mount variety, and which is adapted to be affixed to the receiver of a firearm. The base includes a side plate part 4 which has a pair of openings 6 to receive pins for securement to the firearm receiver. A top plate part 8 overlies the top of the receiver and is provided with a rearward opening 10, a pair of intermediate threaded openings 12, and a forward threaded opening 14. A lateral slot 16 is also provided.

An anvil member 18 is secured to the base 2 by means of screws 20 passing through openings 22 and threaded into the base openings 12. The anvil 18 includes a forward portion 24 and a rearward elevated portion 26. A longitudinally extending upwardly turned tab 28 is formed on the forward portion 24 and includes a hole 30 which receives annd holds in place one end of a windage adjustment spring 32. The spring 32 includes a V-shaped mid portion 34 and extending free end portions 36. The elevated part 26 of the anvil 18 includes a vertically extending opening 38 having a chordal side wall part 40, which opening is aligned with the opening 10 on the base. An elevation adjustment drive pin 42 having a threaded exterior and a chordal flat wall part 44 is mounted in the base opening 10 slidably contained within the anvil opening 38. An elevation adjustment knob or collar 46 having an axial threaded opening 48 is threaded onto the elevation adjustment drive pin 42 and sandwiched between the base 2 and the anvil part 26.

A cradle member 50 having an upper concave surface 52 and downwardly turned side walls 54 provides means upon which the sighting device rests. Straps (not shown) or the like, which may be purely conventional, may be used to secure the sighting device to the cradle 50. The cradle 50 further includes a downwardly extending mid portion 56 having a bottom downwardly curved wall 58 with an opening 60 therethrough. The curved wall 58 serves as a single pivot in both the vertical and horizontal directions for the cradle 50. A threaded opening 62 is formed in one of the downwardly extending side walls 54 to receive a windage adjustment screw 64. A pivot screw 66 extends through the pivot opening 60 in the cradle and is threaded into the threaded opening 14 in the base. A thrust washer 68 is mounted on the pivot screw 66 and biases the cradle pivot 58 downwardly onto the base. A slot 70 is formed in the cradle and receives one free end 72 of an elevation spring 74, the other free end 76 of which is received in the base slot 16. A flat surface 78 is formed on the rear end of the concave surface 52 of the cradle to engage the top surface of the elevation drive pin 42.

FIG. 2 best illustrates the mode of operation of the elevation adjustment of the mount. The pivot pin 66 affixes the cradle 50 to the base 2 and provides a recoil stop for the mount and sight S (shown in phantom). The concave surface 58 provides a pivot about which the cradle can be both vertically and horizontally pivoted. The elevation spring 74 is disposed on one side of the pivot 58 and biases the cradle 50 vertically and against the elevation drive pin 42 which is disposed on the other side of the pivot 58. To adjust for elevation, one need merely rotate the elevation adjustment knob 46 thus raising or lowering the drive pin 42 with a resulting swinging of the cradle 50 vertically about its pivot 58.

FIG. 3 best illustrates the mode of operation of the windage adjustment of the mount. As previously noted, the anvil 18 is secured to the base 2 and the windage spring 32 is disposed with one of its end portions 36 engaging the hole 30 in the anvil tab 28 and the other of its end portions 36 engaging a similar hole formed in one of the downwardly turned side walls 54 of the cradle 50. Thus the spring 32 biases the cradle 50, as viewed in FIG. 3, in a counter-clockwise direction about the pivot 58. The windage adjustment screw 64 is threaded through the cradle opening 62 so that the inner free end of the screw 64 bears against the anvil tab 28. By advancing the screw 64 into the opening 62, the cradle 50 is pulled in a clockwise direction about the pivot 58 against the bias of the spring 32 further compressing the latter. Conversely, by withdrawing the screw 64 from the opening 62, the cradle 50 is pulled in a counter-clockwise direction about the pivot 58 by the compressed spring 32. Thus horizontal pivoting, or windage adjustment of the cradle and sight are accomplished by manipulating the windage screw 64 which is always biased by the spring 32 against the anvil tab 28.

It will be readily appreciated that both windage and elevation adjustment of the sight can be made with only one hand, while viewing the target if desired. The construction is simple and inexpensive, while at the same time being reliable. A single pivot permits a wide latitude of horizontal and vertical adjustment, which adjustment is instantaneous due to the springs biasing the mount cradle in both the horizontal and vertical. The mount can be readily adapted with means to provide an audible indication of the amount of angular movement in both vertical and horizontal directions, if desired.

Since many changes and variations of the disclosed embodiment of the invention may be made without departing from the inventive concept, it is not intended to limit the invention otherwise than as required by the appended claims.

What is claimed is:

1. A gunsight mount of the type having windage and elevation adjustment capabilities, said mount comprising:
   a. a fixed member adapted to be fixed to a firearm;
   b. a pivotable cradle providing a surface upon which a sight can be mounted;
   c. means forming a single pivot for said pivotable cradle, said pivot enabling said pivotable cradle to be pivoted both in a horizontal and a vertical direction with respect to said fixed member;
   d. first spring means engaging said pivotable cradle for biasing the latter vertically about said pivot;
   e. first drive means engaging said pivotable cradle for imparting vertical pivoting movement to said pivotable cradle about said pivot against the bias of said first spring means;
   f. second spring means engaging said pivotable cradle for biasing the latter horizontally about said pivot; and
   g. second drive means engaging said pivotable cradle for imparting horizontal pivoting movement to said pivotable cradle about said pivot against the bias of said second spring means.

2. a gunsight mount of the type having windage and elevation adjustment capabilities, said mount comprising:
   a. a fixed member adapted to be fixed to a firearm;
   b. a cradle including means for receiving a gunsight and also including pivot means, said pivot means forming a single pivot about which said cradle can be pivoted both vertically and horizontally;
   c. threaded elevation adjustment means engaging said cradle and movable vertically with respect to said fixed member,
   d. first spring means engaging said cradle and operative to bias said cradle about said pivot into engagement with said elevation adjustment means whereby vertical upward or downward movement of said elevation means imparts corresponding vertical pivoting movement to said cradle;
   e. threaded windage adjustment means engaging said cradle and movable horizontally with respect to said fixed member; and
   f. second spring means engaging said cradle and operative to bias said cradle about said pivot in a horizontal direction, said second spring means being operative to bias said windage adjustment means into engagement with said fixed member whereby horizontal movement of said windage adjustment means in opposite directions imparts corresponding horizontal pivoting movement to said cradle.

3. A gunsight mount of the type having windage and elevation adjustment capabilities, said mount comprising:
   a. a base adapted to be fixed to a firearm;
   b. means providing an anvil secured to said base;
   c. a cradle for supporting a gunsight, said cradle including means providing a single pivot whereby said cradle can be pivoted in the horizontal and vertical about said pivot;
   d. recoil stop means extending through said pivot and securing said cradle to said base;
   e. elevation adjustment means reciprocally moveable vertically with respect to said base;
   f. elevation spring means mounted on said base and engaging said cradle to bias the latter vertically about said pivot into engagement with said elevation adjustment means whereby said cradle is pivoted vertically about said pivot in response to vertical movement of said elevation adjustment means;
   g. windage adjustment means mounted on said cradle and engaging said anvil, said windage adjustment means being horizontally movable with respect to said anvil; and
   h. windage spring means engaging said cradle and operative to bias said cradle horizontally about said pivot to bias a free end of said windage adjustment means against said anvil whereby horizontal movement of said windage adjustment means results in horizontal pivoting of said cradle about said pivot.

* * * * *